(12) United States Patent
Saeki

(10) Patent No.: US 7,000,836 B2
(45) Date of Patent: Feb. 21, 2006

(54) METHOD OF SELF-TESTING IC CARD READERS

(75) Inventor: Kazuto Saeki, Suwa-gun (JP)

(73) Assignee: Sankyo Seiki Mfg. Co. Ltd., Nagano (JP)

( * ) Notice: Subject to any disclaimer, the term of this patent is extended or adjusted under 35 U.S.C. 154(b) by 119 days.

(21) Appl. No.: 10/368,965

(22) Filed: Feb. 19, 2003

(65) Prior Publication Data

US 2004/0099737 A1    May 27, 2004

(30) Foreign Application Priority Data

Feb. 19, 2002  (JP) ............................. 2002-042241

(51) Int. Cl.
G06K 7/08      (2006.01)
(52) U.S. Cl. ..................................... 235/451; 235/492
(58) Field of Classification Search ............... 235/451, 235/438, 435, 441, 492, 380; 702/183, 188

See application file for complete search history.

(56) References Cited

U.S. PATENT DOCUMENTS

| | | | |
|---|---|---|---|
| 5,103,079 A * | 4/1992 | Barakai et al. | 235/380 |
| 5,380,991 A * | 1/1995 | Valencia et al. | 235/383 |
| 5,835,864 A * | 11/1998 | Diehl et al. | 725/140 |
| 5,861,614 A * | 1/1999 | Gardner | 235/379 |
| 5,954,808 A * | 9/1999 | Paul | 710/104 |
| 6,192,436 B1 * | 2/2001 | Jacobson et al. | 710/104 |
| 6,253,163 B1 * | 6/2001 | Lapie | 702/183 |
| 6,308,270 B1 * | 10/2001 | Guthery | 713/200 |
| 6,452,616 B1 * | 9/2002 | De Vito et al. | 345/825 |
| 6,505,144 B1 * | 1/2003 | Lapie | 702/183 |

* cited by examiner

Primary Examiner—Thien M. Le
Assistant Examiner—Kimberly D. Nguyen
(74) Attorney, Agent, or Firm—Reed Smith LLP

(57) ABSTRACT

A method of self-testing an IC card reader. The IC card reader communicates data with an IC card. The IC card reader sends the result of the communication to a higher level apparatus. Before the higher level apparatus issues an IC card execution command, the IC card is activated so as to determine whether the communication with the IC card is normal or abnormal based on success or failure of the activation, followed by storing the test result.

10 Claims, 3 Drawing Sheets

METHOD OF SELF-TESTING IC CARD READERS

FIELD OF THE INVENTION

The present invention relates to the method of processing data for an IC card reader. More specifically, the present invention relates to a method of self-testing whether the communication between an IC card reader and the IC card reader is normal or abnormal.

BACKGROUND OF THE INVENTION

The IC card reader-writer (hereinafter referred to as "IC card reader") which reads or writes data from/to an IC card is configured mainly with the hardware illustrated in FIG. 2. More specifically, the IC card reader comprises: a CPU (central data processing unit) for controlling the IC card reader 1; a ROM 3 for storing sequences and data required for IC card reader 1 to process data; a RAM 4 for temporarily storing required data as necessary; a driver IC 5 (hereinafter referred to as a "driver") for controlling hardware required for communications between IC card 7 and IC card reader 1 (e.g., setting of a voltage, detection of excess current, adjusting power supply, etc.); and an IC contact 6, which is a physical interface between IC card 7 and IC card reader 1. IC card reader 1 is built into a higher level apparatus (not illustrated) such as an ID recognition terminal, a banking transaction terminal, and the like.

IC contact 6 has a corresponding driver 5 which together define a module assembly (some IC card readers have more than two modules). In this case, the $2^{nd}$ from the last IC card 7 is a so called "Secure Application Module" (SAM) designed for managing security information and the like. Usually, IC card reader 1 is equipped with one or more SAMs. In this disclosure, a module of hardware that provides a unit (module) of communication is referred to as an "IC communication module". As shown by the area enclosed by dotted lines in FIG. 1 the IC communication module 8 comprises: a driver 5; an IC contact 6; and an IC card 7.

Assume that IC card 7 is inserted into IC card reader 1. IC card 7 must be activated before it is used. IC card 7 is activated in the following manner: a higher level apparatus issues an activation command to IC card reader 1, which, then, activates IC card 7. The International Standards Organization (ISO), Japan Industrial Standards Organization (JIS), or the like has standardized the activation process. More specifically, the activation is performed as follows: power and a clock signal are supplied to IC card 7; a resetting signal enters the high mode. IC card 7 returns its response to IC card reader 1, which then returns the response to the higher level apparatus without modification. IC card 7 is thus activated.

In contrast, when there is something wrong with IC communication module 8, activation of IC card 7 fails and IC card reader 1 communicates an error to a higher level apparatus. FIG. 3 illustrates an example of this communication: the higher level apparatus sends an activation command (Step 101) causing IC card reader 1 to execute activation processing on IC card 7 (Step 102). When trouble in power supply is detected (Step 103), IC card reader 1 communicates with the higher level apparatus the error message "abnormal power supply to IC card" (Step 104). In this example, detection of "abnormal power supply to an IC card" is a function which driver 5 provides. The detection takes place in the following manner: first, an operator turns the power on (hereinafter referred to as "PWRON") signal of driver 5 into the High mode so as to supply power to IC card 7. Driver 5 supplies power to IC card 7 upon the PWRON signal's entering the High mode. When power supply to IC card 7 is normal, the power source-monitoring (hereinafter referred to as "RDYMOD") signal enters the High mode. After the PWRON signal enters the High mode, IC card reader 1 monitors the power source-monitoring signal; if the power source-monitoring signal does not enter the High mode within a given time period, it is determined that "power supply to the IC card is abnormal". In contrast, when IC card 7 is activated, the PWRON signal should always be in the High mode. As long as the power-source monitoring signal is regularly monitored, the state in which "power supply to an IC card is abnormal" can readily be detected.

As illustrated in FIG. 4, when an activation command from the higher level apparatus (Step 105) causes IC card reader 1 to execute an activation of IC card 7 (Step 106), it is confirmed that power supply to IC card 7 is normal (Step 107). When there is no response from IC card 7 or an abnormal response (Step 108), IC card reader 1 sends the error message "power supply to IC card is abnormal" to the higher level apparatus (Step 109).

When driver 5 detects spikes of current (excess current etc.) or an unusually low power voltage or defective driver 5 itself, the power source-monitoring signal does not enter the High mode and the message "power supply to IC card is abnormal" is communicated (with the higher level apparatus). When IC contact 6 is defective (bent or broken or the like), or there is something wrong with IC card 7, the power source-monitoring signal does not enter the High mode and the message "power supply to IC card is abnormal" is communicated (with the higher level apparatus). Moreover, when there is no response or an abnormal response is received from IC card 7, "IC card activation failed" is also communicated (with the higher level apparatus).

Nonetheless, in conventional technology, even when abnormality exists in IC communication module 8, abnormality cannot be detected until the higher level apparatus issues an activation command to IC card reader 1, which then executes activation of IC card 7. Consequently, abnormality is detected after some communication steps have actually taken place: the completed communication steps are wasted, thereby delaying corrective actions or repair.

Therefore, it is desirable to provide a system and method for checking the condition of communication modules before the higher level apparatus issues an activation command.

SUMMARY OF THE INVENTION

According to the invention, a method of self-testing an IC card reader wherein the IC card reader communicates data with an IC card wherein the IC card reader sends the result of the communication to a higher level apparatus wherein, before the higher level apparatus issues an IC card execution command, activation is executed for each IC card so as to determine whether the communication with the IC card is normal or abnormal based on success or failure of the activation, followed by storing the test results.

As a result, when an IC card is successfully activated, there is normal communication with the IC card reader. When activation of an IC card fails, there is a problem with communication between the IC card and the IC card reader. For this reason, by having an IC card reader execute activation of an IC card, one can confirm whether the IC card's communication with an IC card reader is normal or abnormal before actual communication begins therebetween. In addition, by storing results, the card reader can be isolated from the abnormal components such that it can operate while communicating the abnormality to a higher level apparatus. This also allows the operator to take corrective actions such as letting a manager know the necessity of repairing in an expedient manner.

Further, the invention provides a method of self-testing an IC card reader wherein the IC card reader has multiple communication interfaces corresponding to multiple IC cards; activation of the IC card is executed so as to determine whether the communication with the IC card is normal or abnormal based on success or failure of the activation, followed by storing the test result.

In this way, one can confirm which IC communication module is not working normally before actual communication begins (between the IC card reader and the IC card). The higher level apparatus does not issue an activation command to the abnormal IC communication module since such an issuance would be useless.

Further, the invention is a method of self-testing an IC card reader wherein activation of the IC card fails, power supply to the IC card is determined to be normal or abnormal, followed by storing the test result. In this way, one can separate abnormalities derived from the power supply from other factors.

In another aspect of the invention, a self testing IC card reader capable of activating an IC card in response to an activation command from a host machine is provided. The card reader includes an I/O interface that communicates with an IC card and a driver IC which is coupled to the I/O interface to provide power to the IC card through the I/O interface. A processor in the card reader controls the driver IC and is operable to activate the IC card through the driver IC to determine the status of communication between the processor and the IC card as a self-test before the activation command is received from the host machine.

DETAILED DESCRIPTION OF THE INVENTION

Configurations of the present invention are described herein in detail with reference to the drawings.

Figure 1:
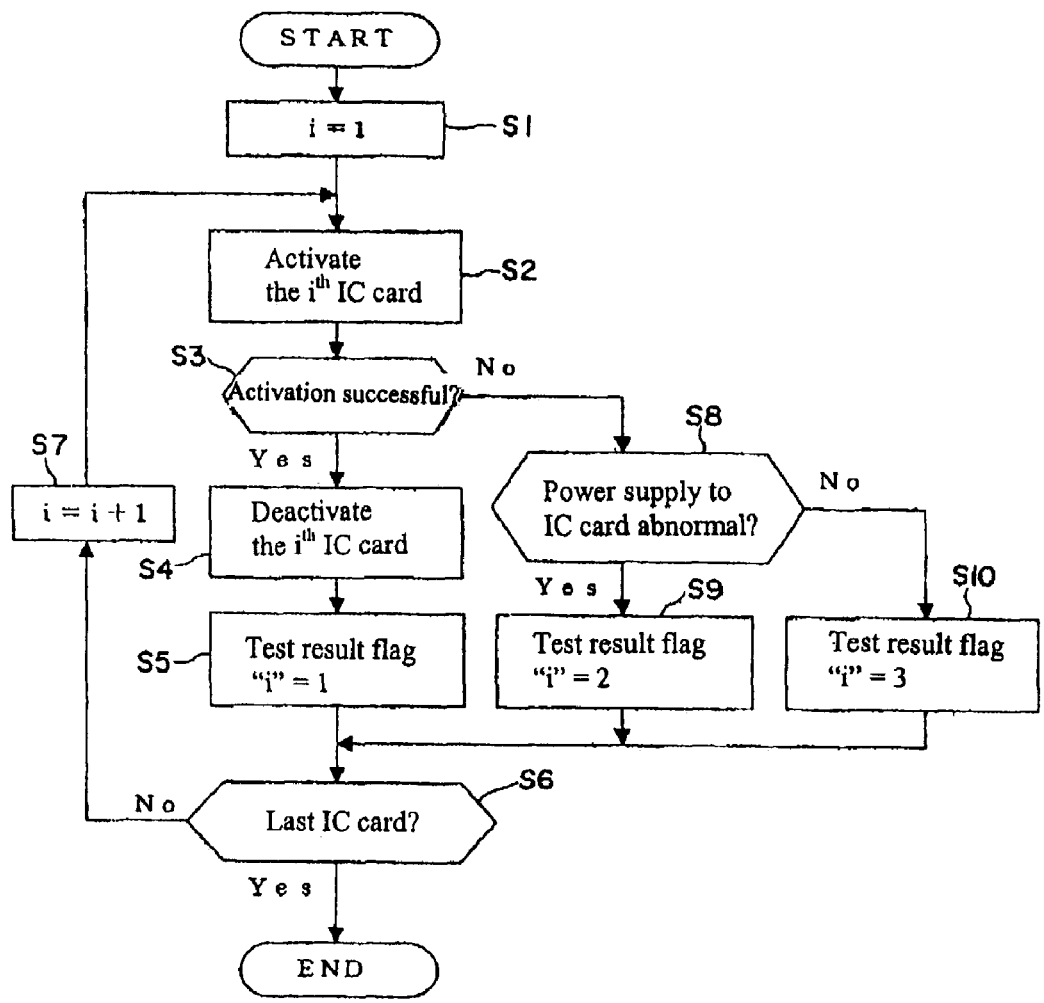
FIG. 1 illustrates an embodiment of the self-testing method of the IC card reader of the present invention with exemplary process steps performed by the IC card reader.

FIG. 1 illustrates an embodiment illustrating the self-testing method of the IC card reader of the present invention. This embodiment describes an example of an application of the present invention to the type of IC card reader that communicates with a contact-type IC card reader and sends the result of the communication to a higher level apparatus or a host machine that controls operation of the IC card reader. Also, this embodiment describes a self-testing method for an IC card reader utilizing an IC card reader having a hardware configuration of conventional technology (See FIG. 2). These embodiments are described with reference to FIG. 2 to help describe the present invention.

IC card reader 1 is constructed with hardware which comprises: a CPU 2 for controlling IC card reader 1; a ROM 3 for storing sequences or data required for data processing by IC card reader 1; a RAM 4 for temporarily storing required data as necessary; driver IC (driver) 5 for controlling hardware (e.g., setting a voltage, detection of excess current or abnormality in power source, etc.); and an Input/Output (I/O) interface such as an IC contact 6 which provides a physical interface (between IC card reader 1) and IC card 7.

Figure 2:
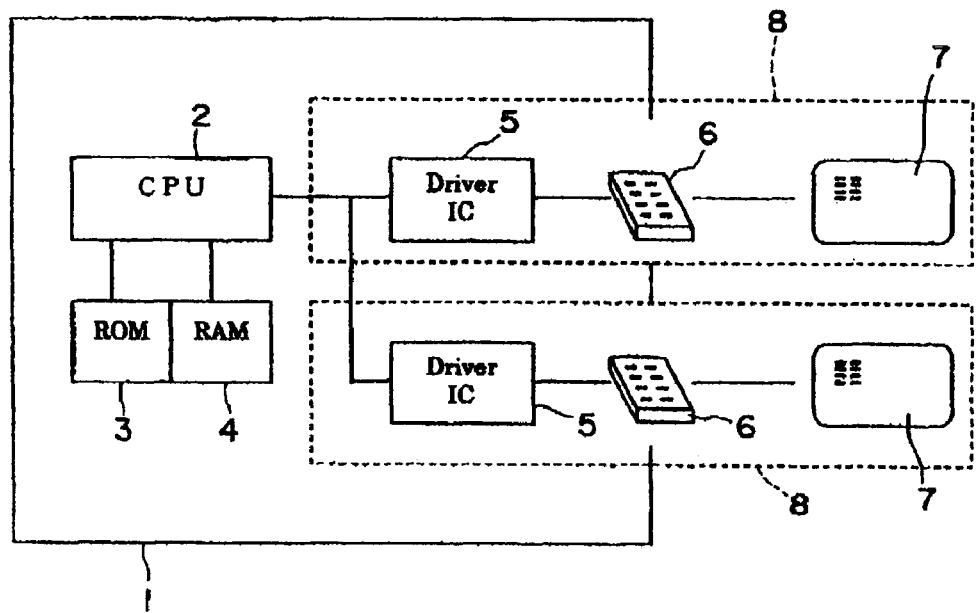
FIG. 2 is an exemplary schematic block diagram illustrating hardware configuration of an IC card reader.
Figure 3:
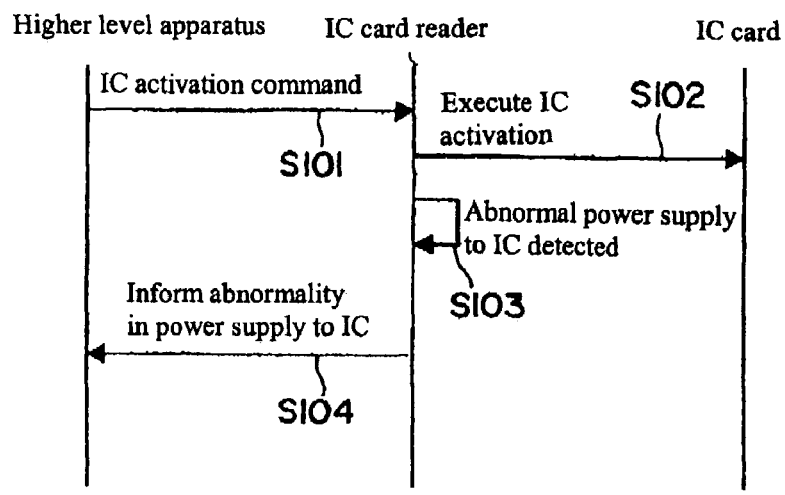
FIG. 3 is a diagram showing a communication sequence of conventional technology between a higher level apparatus, an IC card reader, and an IC Card.
Figure 4:
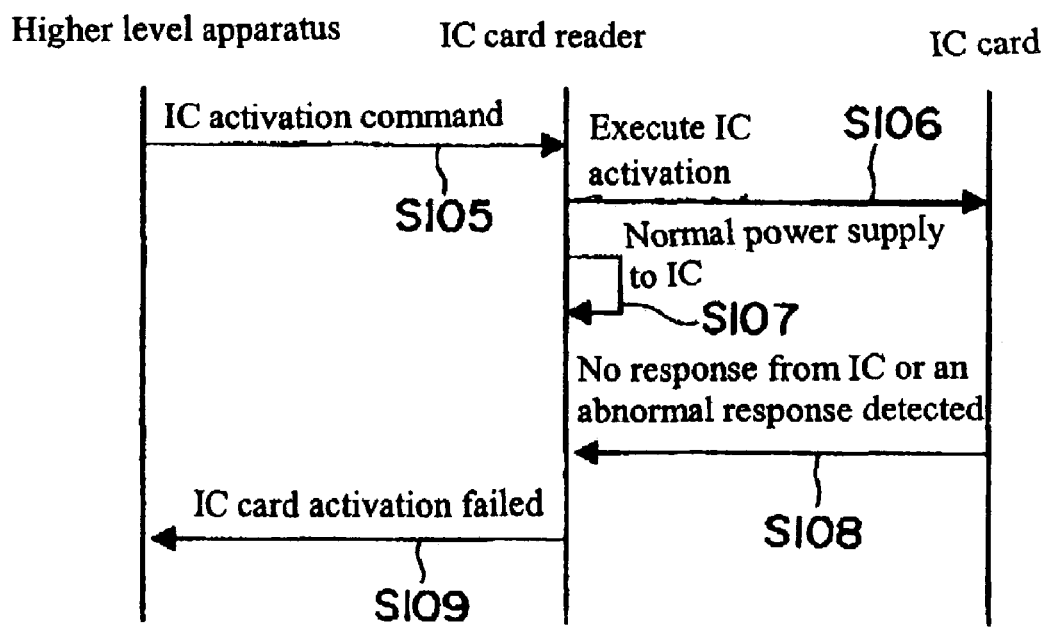
FIG. 4 is a diagram showing an alternate communication sequence of conventional technology for a higher level apparatus, an IC card reader, and an IC Card.

Here, IC card reader 1 of this embodiment has, for example, n units of communication interfaces that correspond to n units of IC cards 7 (including SAM). In an IC card reader for the contact type IC card 7, an interface is constituted with a module of an IC contact 6 and a driver 5 corresponding to the IC contact 6. In this embodiment, IC cards 7 are set up for all n units of IC contacts 6. A combination of driver 5, IC contact 6, and an IC card 7 (the region enclosed by a dotted line in FIG. 2) constitutes an IC communication module 8, which is a self-sufficient unit to perform a module of communication: there are n units of IC communication modules 8 that exist in this embodiment. Note that even though FIG. 2 shows only two IC communication modules as an example, IC communication modules 8 may have more than two IC communication modules thereof.

In the self-testing method for IC card reader 1 of the present invention, the test is initiated by having CPU 2 read out the program stored in a memory device (e.g. ROM 3) which cause card reader 1 to perform the following: (1) to execute activation of IC card 7 before the higher level apparatus issues an activation command for IC card 7, IC card reader 1; (2) to determine whether the communication between (the IC card reader 1) and IC card 7 is normal or abnormal based on success or failure of the activation; and (3) to store the result in a memory device (e.g. RAM 4). A sequence of these processes that IC card reader 1 performs is referred to as "self-testing" in this embodiment.

The self-testing is provided before the higher level apparatus issues an activation command. In this embodiment, self-testing is executed, for example, when IC card reader 1 is initialized (e.g. at the time when power is supplied to IC card reader 1 or at the time when the initialization command is executed, etc.).

One example of self-testing of IC Card reader 1 of the present embodiment is described in detail with reference to the flow chart illustrated in FIG. 1. First, a counter i for counting the number of IC communication modules (IC cards) is initialized by setting i to 1 (Step 1). Next, activation of the $n^{th}$ ($1^{st}$ in this case) IC card 7 that constitutes IC communication module 8 (Step 2) is executed. The contents of activation of this embodiment comply with the ISO or JIS standard or the like. More specifically, the contents include power and clock signal supply to IC card 7 and turning the resetting signal (resetting the signal) to the High mode. Then, it is determined whether activation of IC card 7 is a success or a failure (Step 3). For example, if IC card 7 returns a response within a given time period, it is determined that IC card 7 was successfully activated (Step 3; Yes); if IC card 7 returns no response or returns an abnormal response, it is determined that IC card 7 could not be activated (Step 3; No).

If IC card 7 is successfully activated (Step 3; Yes), it is understood that IC communication module 8 is in a normal condition. Herein, the purpose of activating IC card 7 is not to actually communicate with (IC card reader 1) but to test whether IC communication module 8 is functioning normally. When (IC card 7) does not need to communicate with (card reader 1), IC card 7 does not need to be in an activated state: it is desirable that IC card 7 is in a non-activated state. For this reason, following a successful activation of IC card 7 (Step 3; Yes), deactivation of IC card 7 is executed (Step 4). The contents of deactivation of this embodiment also comply with the ISO or JIS standard or the like. More specifically, the contents include discontinuation of power and clock signal supply to IC card 7 and turning the resetting signal to the Low mode.

The result of the self-test, which is in this case, "activation succeeded" (the $i^{th}$ IC communication module 8 is normal) is stored in a memory device (e.g. RAM 4) (Step 5). Note that it is desirable that the result obtained by each of the n units of IC communication module 8 be managed separately utilizing a data array structure, for example. (Referring to storing the self-test again,) the result is stored in a flag [i] ($1 \leq i \leq n$) in this embodiment. The result "activation succeeded" (IC communication module is normal) is expressed by a numerical value 1 as an example in this embodiment: if activation of the $1^{st}$ IC communication module 8 is successful, the numerical value 1 is stored in the test result flag [1] (Step 5).

In contrast, when activation of IC card 7 fails (Step 3; No), one understands that there is something wrong with IC communication module 8. It is desirable that further diagnosis be provided to analyze what factors caused failure of activation. In this embodiment, for example, the abnormality is segmented into (1) an abnormality in power supply and (2) an abnormality derived from factors other than power supply: when activation (of IC card 7) fails (Step 3; No), an operator should check whether power is supplied without any problem (Step 8). Herein, detection of "power supply to IC card is abnormal" is a function driver 5 provides. The detection sequence is as follows: the PWRON signal is turned to the High mode. As the PWRON signal enters the High mode, drive 5 supplies power to IC card 7. When power is supplied to IC card in a normal condition, power source-monitoring signal (RDYMOD) of driver 5 enters the High mode. When the PWRON signal enters the High mode, IC card reader 1 monitors the PWRON signal. When the PWRON signal does not enter the High mode, it concludes that IC card reader 1 is in the state in which "power supply to an IC card is abnormal." However, as long as IC card 7 is activated, the PWRON signal should always be in the High mode, as a result, IC card reader 1 should regularly monitor the PWRON signal so as to detect the state in which "power supply to an IC card is abnormal". If there is something wrong with power supply to IC card 7 (Step 8; Yes), the result is stored in the test result flag [i] ($1 \leq i \leq n$). The test result such as "power supply to IC card is abnormal" is expressed by, for example, a numerical value 2: If abnormality is detected in the power supply to IC card 7 of the $1^{st}$ IC communication module 8, 2 is stored in the test result flag [1] (Step 9).

The test result showing that the error is due to factors other than abnormal power supply is expressed as a numerical value 3 (Step 8; No), with storage of 3 in test result flag [i] (Step 10). Note that when power supply to IC card 7 shows no abnormality (Step 8; No), one may diagnose hardware operations and the like to detail segments of the hardware constituting IC communication module 8 to separate normal sections from abnormal sections to carefully specify the factors causing an activation failure.

When the test result (herein, any numerical value selected from a group consisting of 1, 2, and 3) is stored in the flag [i] ($1 \leq i \leq n$) that corresponds to the $i^{th}$ IC communication module 8, it is determined whether the $i^{th}$ C communication module 8 (IC card 7) is the last IC card, in other words, if there is any IC communication module 8 which has not gone through the activation process (Step 6). To do so, n, which is the number of IC communication modules, is stored in a memory device (e.g. ROM 3) in advance, and then, i=n is checked by confirming whether the counter i is the same as the number of IC communication modules. If (i≠n), the $i^{th}$ IC communication module 8 is not the last IC card (Step 6; No), therefore, the counter i is incremented by 1 (Step 7) and the above activation process of the next $i^{th}$ IC communication module 8 is executed (Step 2). The sequence is repeated until the activation of the $n^{th}$ IC card 7 of IC communication module 8 is executed and the test result is stored in the test result flag [n], thereby ending the self-testing (Step 6; Yes).

The above self-testing makes it possible to confirm whether IC communication module 8 is in a normal condition before the higher level apparatus issues an activation command. When there are multiple IC communication modules, it can be confirmed which (IC card 7 of) IC communication module 8 is abnormal. Moreover, if any abnormality is detected in IC communication module 8, one can further confirm whether the abnormality is derived from power supply or something other than power supply. With this routine, corrective actions such as letting managers know the necessity of repair can be taken in an expedient manner by informing the test result to a higher apparatus and the like, and the IC communication module 8 having any abnormality can be isolated during operation. Furthermore, the higher level apparatus does not need to issue an activation command of the abnormal IC communication module 8, thereby eliminating a useless step. This is particularly useful to those IC card readers that are always equipped with one or more SAMs.

The above embodiment is a preferred embodiment of the present invention; however, the present invention is not limited to this embodiment and can be modified in any way as long as the spirit of the present invention remains the same. A part or all of the self-testing that is performed by software may be performed by hardware, of course. Also, in the above embodiment, the test result being either the IC card 7-IC card reader communication is normal or abnormal is stored in RAM 4 in IC card reader 1. However, the test result may be stored in an external memory device, or the test result may be transmitted to an external apparatus such as the higher level apparatus. The point is that the test result should be in a condition such that it can be effectively utilized.

Also, in the above embodiment, IC cards are set up for all IC contacts, for example, however, in some cases, an IC card may not be set up for an IC contact as the self-testing is executed. This can be done without causing malfunctioning of the system. When an IC card is not set up for an IC card contact, activation (of the IC card) simply fails (Step 3; No), and abnormality in power supply is not detected (Step 8; No); and the test result flag reads 3. Therefore, when the test results flag reads 3, there are possibilities such as a defective IC contact (bent or broken pin), a defective IC card, a missing IC card or an improperly set up IC card at an IC contact. When the test result flag shows 2 even though an IC card is not set up, one can understand that there is something wrong with driver 5.

Further, in the above embodiment, the present invention was applied to an IC card reader with contact-type IC cards.

However, the present invention may be applied to an IC card reader that accommodates non-contact type IC cards.

As described above, according to the self-testing method for an IC card reader in this invention, an IC card is activated before the higher level apparatus issues an IC card execution command and whether the communication with the IC card is normal or abnormal is determined based on success or failure of the activation. As a result, one can confirm whether the IC card-(IC card reader) communication is normal or abnormal before actual communication begins therebetween. In addition, by storing the result, defective components can be isolated such that the card reader can operate (without interruption) while communicating the abnormality with the higher level apparatus. This also allows the operator to take corrective actions such as letting a manager know the necessity for repair in an expedient manner.

As described above, in the self-testing method for an IC card reader in this invention, the IC card reader has multiple communication interfaces corresponding to multiple IC cards; activation is attempted for each IC card and the normality or abnormality of IC card's communication with a card reader is determined for every IC card, followed by storing each result. In this way, one can confirm which IC communication module is out of order before actual communication begins (between the IC card reader and the IC card). The higher level apparatus does not issue an activation command to the abnormal IC communication module since such an issuance would be useless. This feature is particularly useful for IC card readers equipped with more than one SAM.

Further, according to the self-testing method for an IC card reader as set forth in this invention, when activation of the IC card fails, whether power supply to the IC card is normal is determined, followed by storing the test result. In this way, one can separate abnormality derived from a power source from other factors. This also allows the operator to take corrective actions easily and quickly.

What is claimed is:

1. A method of self-testing an IC card reader having a plurality of communication interfaces corresponding to a plurality of IC cards, wherein said IC card reader communicates data with the plurality of IC cards according to the instruction of a higher level apparatus and sends a result of said communication to the higher level apparatus, without said higher level apparatus issuing an IC card execution command, each of the IC cards is activated by the IC card reader in advance, the IC card reader determines whether said communication with each of the IC cards is normal or abnormal based on success or failure of said activation, and then each of results of whether the communication with each of the IC cards is normal or abnormal are stored in the IC card reader, wherein when said activation of said IC card fails, the power supply to said IC card is determined to be normal or abnormal followed by storing said test result.

2. A self testing IC card reader for activating an IC card in response to an activation command from a host machine, the self testing IC card reader comprising:

an I/O interface operable to communicate with an IC card;

a driver IC coupled to the I/O interface to provide power to the IC card through the I/O interface; and a processor coupled to and operable to control the driver IC, the processor further operable to activate the IC card through the driver IC to determine a status of communication between the processor and the IC card as a self-test before the command to activate the IC card is received from the host machine;

wherein the I/O interface and the driver IC define a communication module;

the self testing IC card reader includes a plurality of communication modules with each being connectable to a corresponding IC card; and the processor is operable to activate each of the IC cards through the corresponding communication module to determine the communication status before the command to activate the IC card is received from the host machine, and report results of the communication status for all of the communication modules to the host machine before the command to activate the IC card is received from the host machine, wherein if the communication status is determined to be abnormal, the processor further determines whether the abnormal status is due to abnormal power supply to the IC card.

3. The method of self-testing an IC card reader as set forth in claim 2 wherein when said activation of said IC card fails, the power supply to said IC card is determined to be normal or abnormal followed by storing said test result.

4. The self testing IC card reader according to claim 2, wherein if the communication status is determined to be abnormal, the processor transmits the abnormal status to the host machine before the command to activate the IC card is received from the host machine.

5. The self testing IC card reader according to claim 2, wherein after the card has been activated, the processor deactivates the IC card through the driver IC before the activation command is received from the host machine.

6. A method of self testing an IC card reader having a plurality of communication interfaces corresponding to a plurality of IC cards for activating each of the IC cards in response to an activation command from a host machine, the method comprising:

activating each of the IC cards as a self-test of the IC card reader;

determining a status of communication between the IC card reader and each of the IC cards before the command to activate each of the IC cards is received from the host machine; and storing the results of the determination of the communication status, and if the communication status is determined to be abnormal, determining whether the abnormal status is due to abnormal power supply to the IC card.

7. The method according to claim 6, further comprising if the communication status is determined to be abnormal, transmitting the abnormal status to the host machine before the command to activate the IC card is received from the host machine.

8. The method according to claim 6, after the step of activating, further comprising deactivating the IC card before the activation command is received from the host machine.

9. A method of self-testing an IC card reader having a plurality of communication interfaces corresponding to a plurality of IC cards, wherein said IC card reader communicates data with the plurality of IC cards according to the instruction of a higher level apparatus and sends a result of said communication to the higher level apparatus, without said higher level apparatus issuing an IC card execution command, each of the IC cards is activated by the IC card reader in advance, the IC card reader determines whether said communication with each of the IC cards is normal or abnormal based on success or failure of said activation, and then each of results of whether the communication with each of the IC cards is normal or abnormal are stored in the IC card reader, wherein the results stored in the IC card reader of whether the communication with each of the IC cards is normal or abnormal are notified to the higher level apparatus before the higher level apparatus issues the IC card execution command.

10. A method of self testing an IC card reader having a plurality of communication interfaces corresponding to a plurality of IC cards for activating each of the IC cards in response to an activation command from a host machine, the method comprising:

activating each of the IC cards as a self-test of the IC card reader;

determining a status of communication between the IC card reader and each of the IC cards before the command to activate each of the IC cards is received from the host machine; and storing the results of the determination of the communication status, wherein the results stored in the IC card reader of whether the communication with each of the IC cards is normal or abnormal are notified to the higher level apparatus before the higher level apparatus issues the IC card execution command.

* * * * *